No. 840,411. PATENTED JAN. 1, 1907.
R. H. ACKERMAN.
ADJUSTABLE REEL FOR HEADERS.
APPLICATION FILED AUG. 1, 1906.
3 SHEETS—SHEET 3.
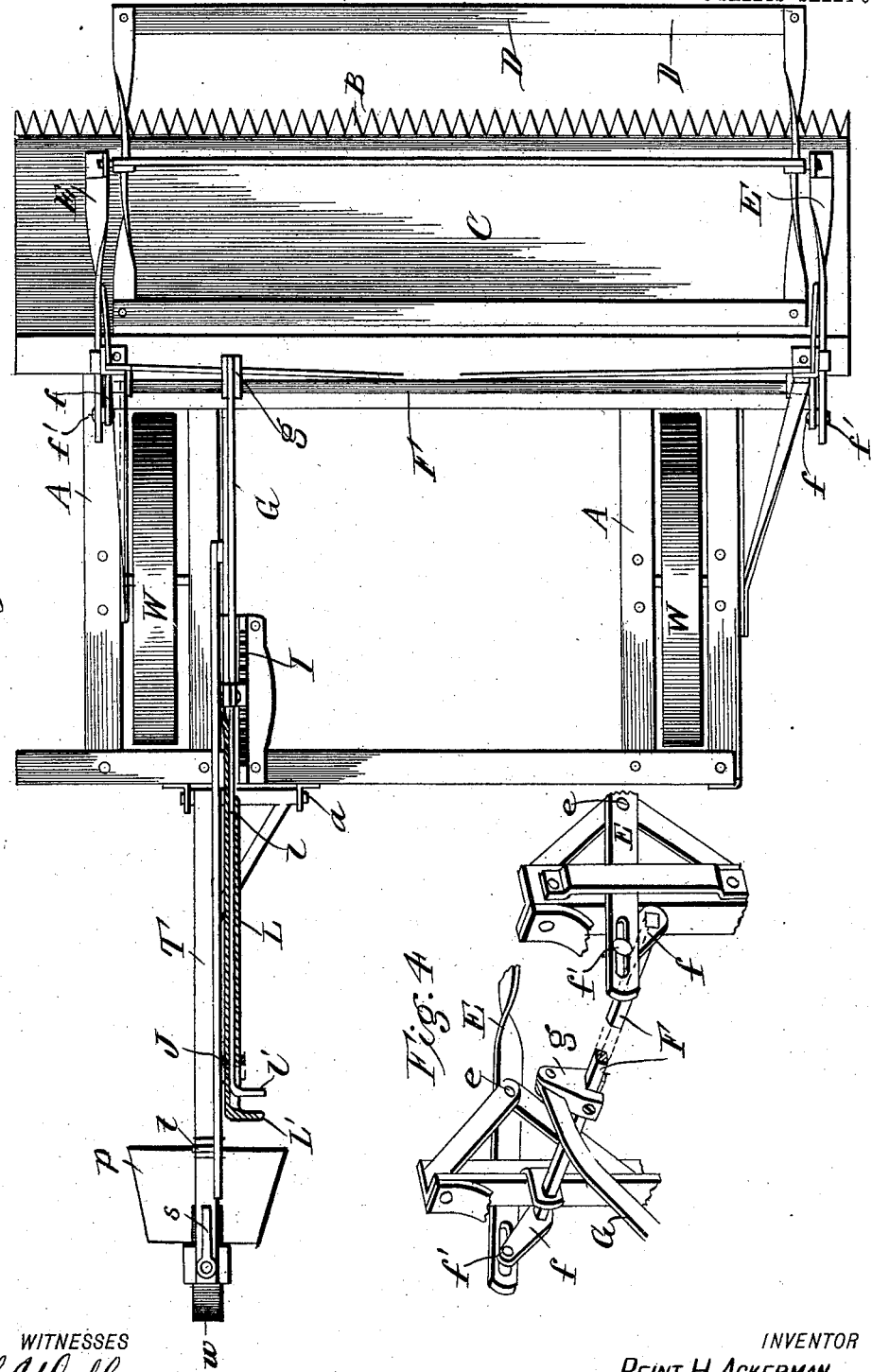
WITNESSES
INVENTOR
REINT H. ACKERMAN
BY
ATTORNEYS

UNITED STATES PATENT OFFICE.

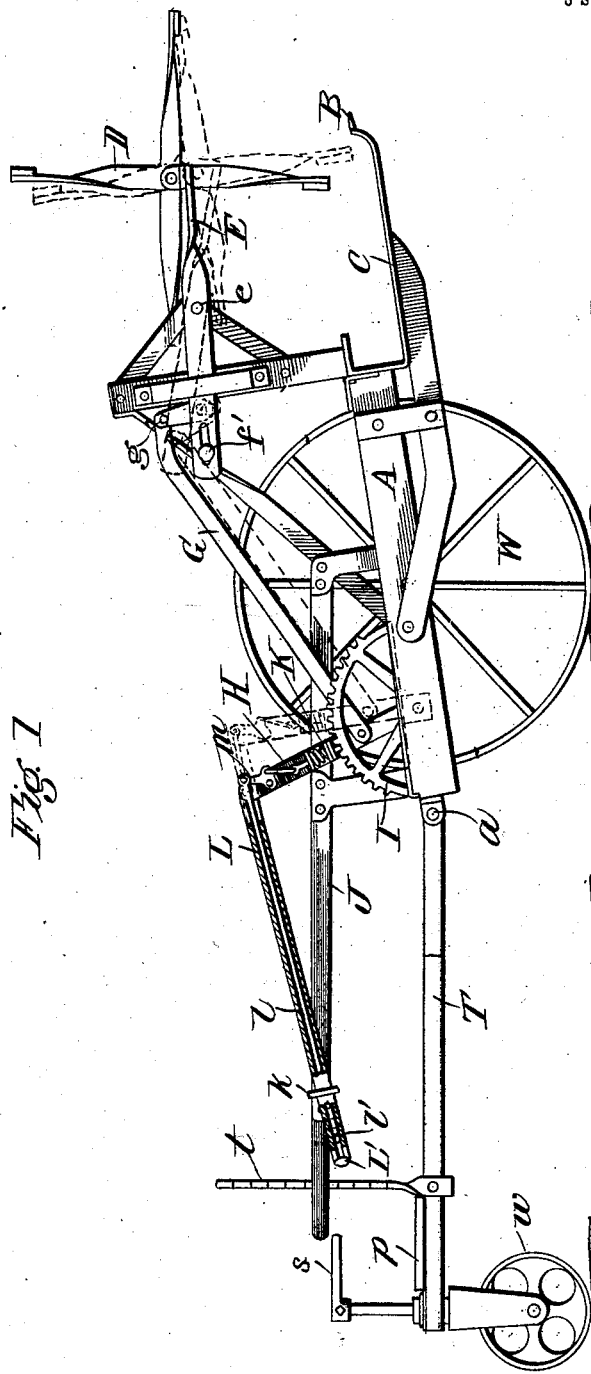

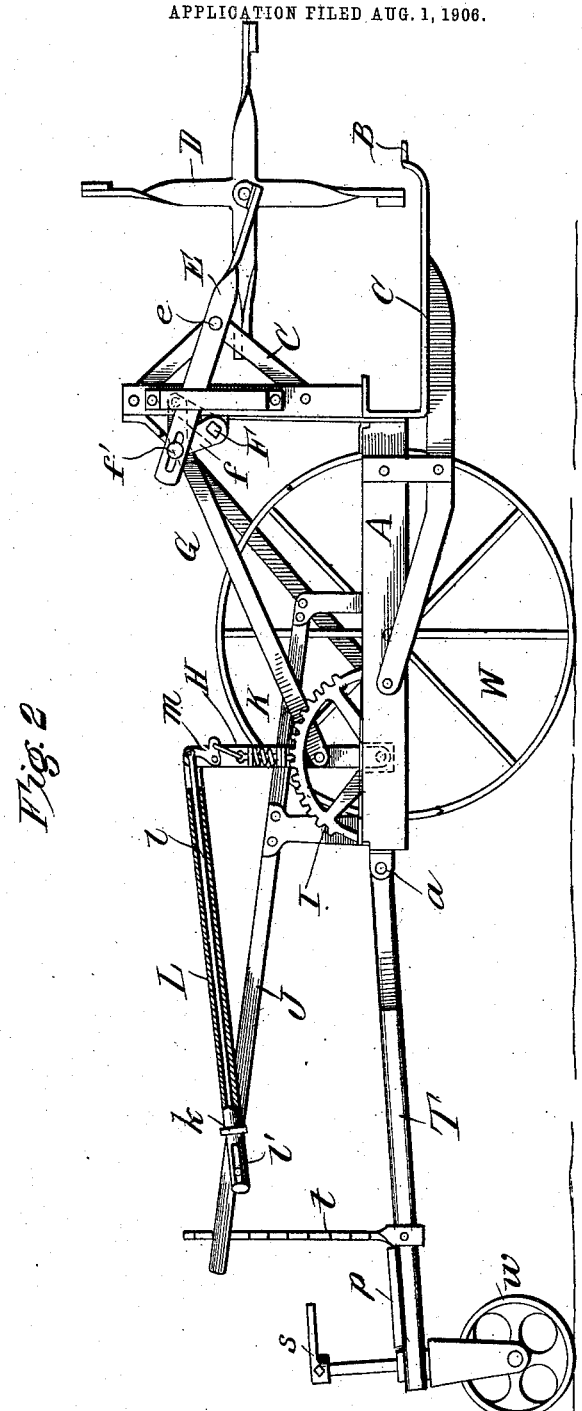

REINT H. ACKERMAN, OF ENDICOTT, WASHINGTON.

ADJUSTABLE REEL FOR HEADERS.

No. 840,411.　　　Specification of Letters Patent.　　　Patented Jan. 1, 1907.

Application filed August 1, 1906. Serial No. 328,740.

*To all whom it may concern:*

Be it known that I, REINT H. ACKERMAN, a citizen of the United States, residing at Endicott, in the county of Whitman and State of Washington, have invented a new and useful Improvement in Adjustable Reels for Headers, of which the following is a specification.

My invention relates to the reels for that class of harvesters known as "headers" which are pushed ahead of the team and have a comb of teeth along the front edge to strip off the heads of grain and leave the stalks standing in the field.

These headers have above the row of teeth a reel for bringing the heads of grain up to the stripping-teeth, and this reel is required to be made adjustable up and down in relation to the teeth to accommodate grain of different height as well as to cut in hollows and on uneven ground. It is important that this adjustment of the reel be made quickly and with one hand without stopping the team, and my invention provides a simple and convenient mechanism for doing this, which I will now proceed to describe with reference to the drawings, in which—

Figure 1 shows a side elevation of a header with my reel-adjusting mechanism applied to it and showing the teeth elevated and the reel also elevated from the teeth. Fig. 2 is a similar view with the teeth and the reel both lowered. Fig. 3 is a plan view, and Fig. 4 is a perspective view, of the rock-shaft and its connections for adjusting the reel-carrying arms.

In the drawings, A represents a main frame mounted upon wheels W W and having rigidly attached to its forward edge the comb of stripping-teeth B, having behind it the usual trough C, in which runs the carrier-belt. (Not shown.) At the rear of the main frame A is hinged at *a* the tongue T, supported at its rear end upon the swiveling-wheel *w*, which turns about a vertical axis and has a steering-arm *s*. A platform *p* is arranged on the rear end of the tongue for the header-man to stand on, and near this point a rigid standard *t* rises from the tongue and has a series of notches or locking adjustments to receive a rearwardly-extending tilting-bar J. This bar is rigidly connected to the main frame A and is used to tilt the same on the wheels W to raise or lower the teeth B of the header, the rear end of the bar being for this purpose fixed in various adjustments along the standard *t*.

As so far described the parts are all of the usual construction.

On the tilting-bar J is fixed a loop-shaped guide or keeper *k*, through which slides a compound reel-adjusting bar consisting of a metal tube L and a metal rod *l*, sliding therein. This reel-adjusting bar L is jointed at its forward end to the top of a lever H, fulcrumed at its lower end to the frame A and swinging about the notched arc-bar I on said frame. The slide-rod *l* in hollow bar L is connected at its forward end to an elbow-lever *m*, which in turn is connected to a spring-bolt K, locking into the notches of the arc-bar I. The rear end of the hollow bar L is turned at right angles to form a handle L', (see Fig. 3,) and the slide-rod *l* in the hollow bar has a similar right-angular bend *l'* sufficiently close to the handle L' to be grasped in the hand along with handle L', and when so grasped the slide-rod *l* is drawn to the rear with an initial movement that unlocks the bolt K and frees the lever H, so that it may be pushed forward or drawn backward by the hand grasping the handle L'.

The lever H is connected between its ends to a long link-bar G, which at its forward end is jointed (see Fig. 4) to a crank-arm *g*, rigidly attached to a rock-shaft F. This rock-shaft has at its opposite ends rigid crank-arms *f f*, whose wrist-pins *f' f'* play in slots in the rear ends of two reel-carrying arms E E, fulcrumed at *e* in an upright frame on each side and carrying at their forward ends journal-bearings for the reel D. As the rock-shaft F is rocked the arms E E are tilted on their center *e* and the reel is raised or lowered to throw it closer to or farther from the teeth B. In Fig. 1 the reel is shown adjusted up some distance above the teeth and in Fig. 2 it is shown close down to the teeth.

In Fig. 1 the tilting-frame is also shown tilted about the axis of the carrying-wheels so as to throw the comb-teeth up for tall grain, and in Fig. 2 the comb-teeth are shown in a lower position for short grain.

It is important that this tilting of the frame A carrying the comb-teeth should be effected by the same movement or at the same time and by the same hand that regulates the approach of the reel to the teeth. To accomplish this, the reel-adjusting bar L is extended through the keeper *k* of the tilting-bar J, so that while bar L may move longitudinally in relation to bar J both move together in the lateral or vertical movement of bar J for tilting the frame A, so that with one hand grasping the two handles L' l' of the reel-adjusting bar the reel-adjusting mechanism is unlocked, the lever H moved forward or backward, and the tilting-bar J raised or lowered by one and the same hand without stopping the machine, and thus saving much valuable time in the harvest-field and enabling the header-man to instantly change the adjustment of both the teeth and reel to meet the varying conditions of different heights of grain or variations in the surface of the ground which may be found in the same field.

I do not claim, broadly, the rock-shaft and cranks for adjusting the reel-carrying arms, as I am aware that this is old.

I claim—

1. In a header, the combination of the reel, the reel-adjusting mechanism, the comb-teeth and the comb-teeth-adjusting devices, the reel-adjusting mechanism being connected to the teeth-adjusting mechanism for simultaneous movement.

2. In a header, the combination of the reel-adjusting mechanism and the comb-teeth-adjusting devices, the reel-adjusting mechanism having a bar movable both longitudinally and up and down and the teeth-adjusting mechanism having a bar movable up and down and the reel-adjusting bar having a sliding connection with the teeth-adjusting bar and coupled with it for a simultaneous up-and-down movement together.

3. In a header, the combination of a tilting main frame having teeth along its forward edge, a rigid tilting-bar projecting rearwardly therefrom, a tongue hinged to the rear of the tilting frame and having a steering-wheel and an upright standard engaged by the tilting-bar, a reel-adjusting bar having a loose sliding connection with the tilting-bar, a lever connecting with the same, a locking device for the lever, a coupling-bar connected to the lever and a transverse rock-shaft having an intermediate crank connected to said coupling-bar and provided also with end cranks, a reel and carrying-arms connected to and operated by the end cranks of the rock-shaft.

4. A reel-adjusting device for a header, comprising a longitudinally-moving hollow bar having a handle at its end, a sliding rod arranged within the same and having also a handle arranged within range of the grasp of the other handle, a lever connected to the hollow bar, a notched arc-bar, a spring-bolt, an elbow connected to the spring-bolt and to the sliding rod, the reel-carrying arms, the reel, and means for connecting the lever to and operating the reel-carrying arms.

REINT H. ACKERMAN.

Witnesses:
JOHN PATTISON,
H. J. ACKERMAN.